(12) United States Patent
Patwardhan et al.

(10) Patent No.: US 9,348,827 B1
(45) Date of Patent: May 24, 2016

(54) FILE-BASED SNAPSHOTS FOR BLOCK-BASED BACKUPS

(71) Applicant: EMC Corporation, Hopkinton, MA (US)

(72) Inventors: Kedar Shrikrishna Patwardhan, Pune (IN); Suraj Multani, Bangalore (IN); Manjunath Tadahal, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 240 days.

(21) Appl. No.: 14/227,290

(22) Filed: Mar. 27, 2014

(51) Int. Cl.
*G06F 17/30* (2006.01)

(52) U.S. Cl.
CPC ............................... *G06F 17/30088* (2013.01)

(58) Field of Classification Search
USPC .................................................. 707/639, 825
See application file for complete search history.

(56) References Cited

U.S. PATENT DOCUMENTS

| | | | | |
|---|---|---|---|---|
| 6,341,341 B1 * | 1/2002 | Grummon | G06F 3/0617 | 711/162 |
| 6,959,310 B2 * | 10/2005 | Eshel | G06F 17/30067 | |
| 7,596,713 B2 * | 9/2009 | Mani-Meitav | G06F 11/1456 | 707/999.2 |
| 7,603,391 B1 * | 10/2009 | Federwisch | G06F 11/2066 | |
| 7,769,721 B2 * | 8/2010 | Ueoka | G06F 11/1662 | 707/679 |
| 7,979,395 B1 * | 7/2011 | Aggarwal | G06F 17/30088 | 707/649 |
| 7,984,085 B1 * | 7/2011 | Aggarwal | G06F 17/30088 | 707/821 |
| 7,991,973 B2 * | 8/2011 | Jacobson | G06F 3/0611 | 707/639 |
| 8,005,797 B1 * | 8/2011 | Chepel | G06F 11/1451 | 707/649 |
| 8,055,613 B1 * | 11/2011 | Mu | G06F 11/1451 | 707/610 |
| 8,074,035 B1 * | 12/2011 | Per | G06F 11/1451 | 707/610 |
| 8,200,638 B1 * | 6/2012 | Zheng | G06F 11/1464 | 707/679 |
| 8,250,033 B1 * | 8/2012 | De Souter | G06F 17/30088 | 707/637 |
| 8,386,492 B2 * | 2/2013 | Anzai | G06F 17/30067 | 707/740 |
| 8,549,518 B1 * | 10/2013 | Aron | G06F 9/45558 | 718/1 |
| 8,601,473 B1 * | 12/2013 | Aron | G06F 9/45533 | 709/223 |
| 8,850,130 B1 * | 9/2014 | Aron | G06F 9/52 | 711/150 |
| 8,863,124 B1 * | 10/2014 | Aron | G06F 9/45533 | 709/223 |
| 9,128,943 B1 * | 9/2015 | Khanduja | G06F 11/1451 | |
| 2001/0044807 A1 * | 11/2001 | Kleiman | G06F 17/30067 | |
| 2002/0049718 A1 * | 4/2002 | Kleiman | G06F 11/1435 | |
| 2003/0101321 A1 * | 5/2003 | Ohran | G06F 11/1451 | 711/162 |
| 2010/0077160 A1 * | 3/2010 | Liu | G06F 3/0482 | 711/162 |
| 2010/0306174 A1 * | 12/2010 | Otani | G06F 11/1464 | 707/640 |
| 2011/0252208 A1 * | 10/2011 | Ali | G06F 11/1451 | 711/162 |
| 2012/0151245 A1 * | 6/2012 | Chang | G06F 17/30227 | 714/4.1 |

\* cited by examiner

*Primary Examiner* — Cam-Linh Nguyen
(74) *Attorney, Agent, or Firm* — Dergosits & Noah LLP; Todd A. Noah (57) ABSTRACT

File-based snapshots for block-based backups are described. A system records an identifier corresponding to a modified block in a file system into a modified block map. The system creates a modified file block map based on a modified file. The system identifies a modified file block corresponding to the modified file based on an intersection of the modified block map and the modified file block map. The system creates a mounted backup image by mounting a previously created block-based backup of the file system onto a proxy host. The system enables a forward snapshot of the mounted backup image. The system reads the modified file block from the file system using a file system read interface. The system creates a forward snapshot file for the modified file by writing the modified file block to the mounted backup image using a file system write interface.

20 Claims, 4 Drawing Sheets

FILE-BASED SNAPSHOTS FOR BLOCK-BASED BACKUPS

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

A snapshot is a capture of a state of a data object, such as a file system or an application, at a specific moment in time. A file system may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup application to create snapshots of data objects stored on multiple storage arrays.

In data transmission and data storage, a block is a sequence of bytes or bits having a fixed length, or block size. The process of putting data into blocks is used to facilitate the handling of a data-stream by a computer program receiving data. Blocked data is normally read a whole block at a time. Blocking is almost universally employed when storing data to 9-track magnetic tape, to rotating media such as floppy disks, hard disks, optical disks, and to NAND flash memory. Most file systems are based on a block device, which is a level of abstraction for the hardware responsible for storing and retrieving specified blocks of data, though the block size in file systems may be a multiple of the physical block size. In many file systems, a single block might contain only a part of a single file. Block storage is normally abstracted by a file system or database management system for use by applications and end users. An incremental block-based backup involves taking a snapshot of a file system, reading the blocks that have been modified since the last backup, and storing copies of the modified blocks into some block backed backup format, such as virtual hard disk (VHD).

DETAILED DESCRIPTION

Currently, only a few block-based backup applications offer selective file backup, but at an enormous cost in terms of backup window and storage. For example, if 10 files out of 1,000,000 files are modified since the last backup, a prior art block-based backup application may take a snapshot of a file system, identify the blocks that correspond to the 10 modified files, and then delete the blocks that correspond to the 999,990 un-modified files. This time and resource consuming process defeats many of the advantages of using a block-based backup tool. Furthermore, such an expensive process does not provide a consistent image of the file system at the block level because the modified blocks lack file system metadata that is not stored in the blocks of modified data, such as free space block maps, inode maps, attribute inode maps, file extent type descriptors etc. A file system may have parts of a file compressed on a disk or have "zero filled on demand extents," but such stored data cannot be understood or interpreted by a backup application reading only modified blocks of some of the files in the file system without the file system metadata.

Embodiments herein provide file-based snapshots for block-based backups. An identifier corresponding to a modified block in a file system is recorded into a modified block map. A modified file block map is created based on a modified file. A modified file block corresponding to the modified file is identified based on an intersection of the modified block map and the modified file block map. A mounted backup image is created by mounting a previously created block-based backup of the file system onto a proxy host. A forward snapshot is enabled of the mounted backup image. The modified file block is read from the file system using a file system read interface. A forward snapshot file is created for the modified file by writing the modified file block to the mounted backup image using a file system write interface.

For example, a blocking enhancer records the block identifier 1 that identifies a block modified since the last backup, and stores the block identifier 1 into a modified block map. The blocking enhancer also identifies that the File A has been modified, and creates a modified file block map based on the File A, which includes the block identifiers 1 and 2. Then the blocking enhancer intersects its maps, which includes the block identifiers 1 and 2 for the modified File A and includes the block identifier 1 for the modified block map, to identify the block identifier 1 for the modified File A, which the blocking enhancer reads using a file system read interface. To prepare for writing this modified block, the blocking enhancer mounts the previously created block-based backup of the file system onto a backup server, and enables a forward snapshot of the mounted backup image. Then the blocking enhancer writes the modified block 1 for the modified File A to the mounted backup image using a file system write interface, such that the forward snapshot function merges the unmodified block 1 from the mounted backup image with the modified block 2, along with the metadata for the modified File A, to create a complete forward snapshot file for the modified File A.

The blocking enhancer provides a quick and efficient way of creating block-based backups of modified blocks of modified files and merging the modified blocks with unmodified blocks from an existing backup image without compromising the consistency of the file system in the backup image. Since the blocking enhancer reads only the modified blocks of modified files to be backed up using the file system "read" system call and stores the modified blocks using the file system "write" system call to update the block-based backup image, the backup image is always consistent from the file system's perspective. The blocking enhancer enables selectively backing up of a subset of files in a file system.

Figure 1:
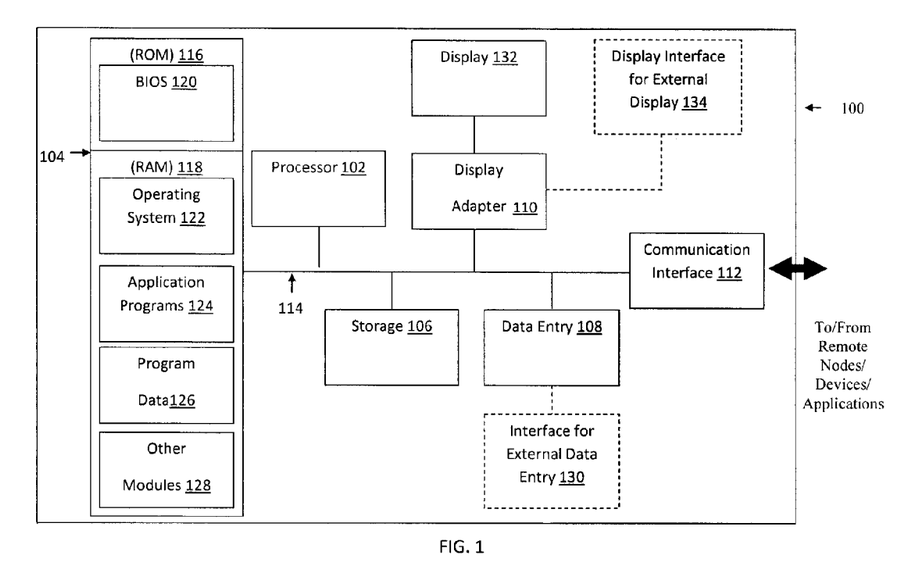
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for file-based snapshots for block-based backups.

Figure 2:
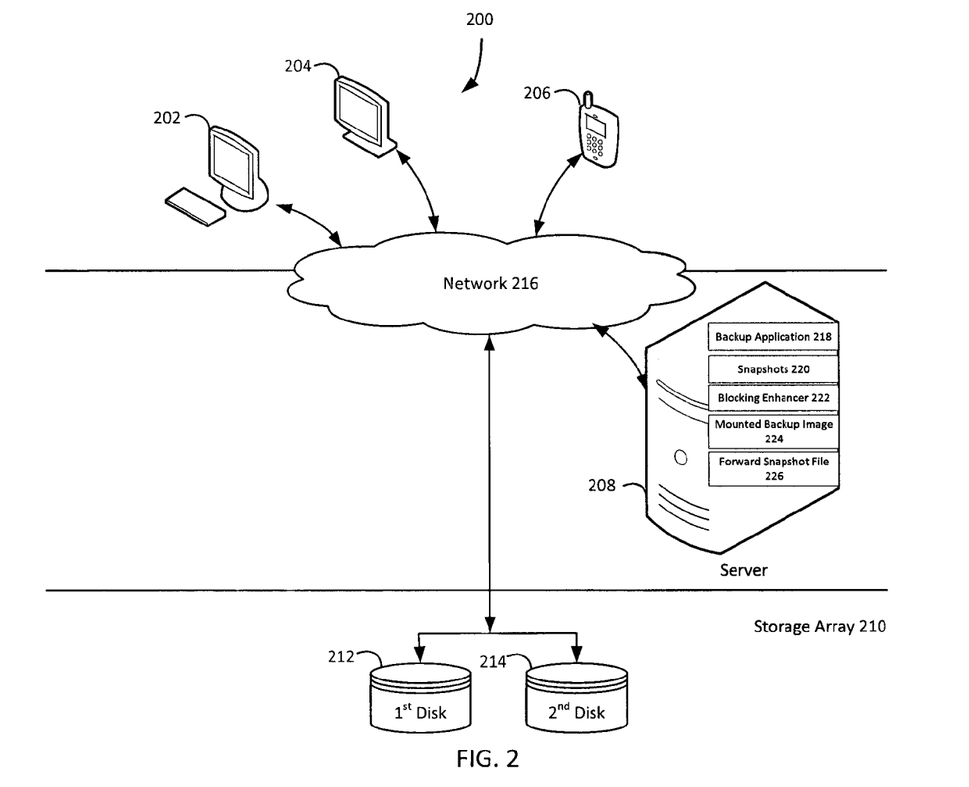
FIG. 2 illustrates a block diagram of an example system for file-based snapshots for block-based backups, under an embodiment.

Only a few prior art block-based backup tools offer selective file backup, but at an enormous cost in terms of backup window and storage, and this expensive process does not provide a consistent image of the file system at the block level because the modified blocks lack file system metadata that is not stored in the blocks of modified data. Embodiments herein enable file-based snapshots for block-based backups. A blocking enhancer provides a quick and efficient way of creating block-based backups of modified blocks of modified files and merging the modified blocks with unmodified blocks from an existing backup image without compromising the consistency of the file system in the backup image FIG. 2 illustrates a block diagram of a system that implements file-based snapshots for block-based backups, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 and a storage array 210 that may be provided by a hosting company. The storage array 210 includes a first disk 212 and a second disk 214. The clients 202-206, the server 208, and the storage array 210 communicate via a network 216. Although FIG. 2 depicts the system 200 with three clients 202-206, one server 208, one storage array 210, two disks 212-214, and one network 216, the system 200 may include any number of clients 202-206, servers 208, storage arrays 210, disks 212-214, and networks 216. The clients 202-206 and the server 208 may each be substantially similar to the system 100 depicted in FIG. 1.

The server 208 includes a backup application 218, snapshots 220, a blocking enhancer 222, a mounted backup image 224, and forward snapshot file 226. The backup application 218 creates the snapshots 220 of data objects for the clients 202-206 and/or the server 208, and stores the snapshots 220 on the server 208. The system 200 enables the backup application 218 to execute a rollback based on snapshots 220. FIG. 2 depicts the system elements 218-226 residing completely on the server 208, but the system elements 218-226 may reside completely on the server 204, completely on the clients 202-206, completely on another server that is not depicted in FIG. 2, or in any combination of partially on the server 208, partially on the clients 202-206, and partially on the other server.

The backup application 218 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used.

The backup application 218 may previously create a block-based backup of a file system. For example, the backup application 218 creates a full backup of a file system by reading all of the blocks of the file system and storing copies of the blocks in a block based format.

The blocking enhancer 222 records an identifier corresponding to a modified block in a file system into a modified block map. For example, the blocking enhancer 222 records the block identifier 1102 that corresponds to a block modified since the last backup, and stores the block identifier 1102 into a modified block map. The blocking enhancer 222 facilitates the next incremental backup by tracking all of the modified blocks of the file system using a modified block tracking driver, and storing identifiers of the modified blocks in a modified block map.

The blocking enhancer 222 creates a modified file block map based on a modified file. For example, the blocking enhancer 222 creates a modified file block map based on the modified File A, which corresponds to the block identifiers 1101 and 1102. At the time of next incremental backup, the blocking enhancer 222 obtains a list of the modified files that need to be backed-up, and obtains a block map of these modified files. The blocking enhancer 222 may obtain the modified file block map done by querying the file system for the block map of each file to be selectively backed up. The blocking enhancer 222 may create the modified file block map by using an application program interface associated with the file system to query the file system based on the modified file. For example, file systems such as new technology file system (NTFS) and resilient file system (ReFS) expose an application program interface to obtain the block map of a file. The modified file block map may include a mapping of a logical offset corresponding to the modified file to a corresponding physical location of a corresponding block that contains data corresponding to the logical offset.

The blocking enhancer 222 identifies a modified file block corresponding to the modified file based on an intersection of the modified block map and the modified file block map. For example, the blocking enhancer 222 intersects the modified block map, which includes the block identifier 1102, and the modified file block map, which includes the block identifiers 1101 and 1102 corresponding to modified File A, to identify the block identifier 1102 corresponding to the modified File A. The intersection provides a list of modified blocks corresponding to the modified files. The blocking enhancer 222 may identify a logical offset and a length of consecutive modified blocks corresponding to the modified file.

The blocking enhancer 222 creates the mounted backup image 224 by mounting a previously created block-based backup of the file system onto a proxy host. For example, the blocking enhancer 222 mounts the previously created block-based backup of the file system onto the server 208 to create the mounted backup image 224.

The blocking enhancer 222 enables a forward snapshot of the mounted backup image 224. For example, the blocking enhancer 222 enables a forward snapshot of the mounted backup image 224. Enabling a forward snapshot for the mounted backup image 224 results in all of the modified blocks written to the mounted backup image 224 to be merged together with related unmodified blocks stored in the mounted backup image 224 and written together in a new file called the forward snapshot file 226.

The blocking enhancer 222 reads the modified file block from the file system using a file system read interface. For example, the blocking enhancer 222 uses a file system read( ) interface to read the modified block 1102 corresponding to the modified File A. The blocking enhancer 222 reads only the modified blocks of the modified files to be backed up because the intersection of the maps also identified unmodified blocks of the modified files, which do not need to be read.

The blocking enhancer 222 creates the forward snapshot file 226 for the modified file by writing the modified file block to the mounted backup image 224 using a file system write interface. For example, the blocking enhancer 222 uses a file system write( ) interface to write the modified block 1102 corresponding to the modified File A to the mounted backup image 224 at the same offset, and the forward snapshot function merges the unmodified block 1101 from the mounted backup image 224 with the modified block 1102, along with the metadata for the modified File A to create a complete forward snapshot file 226 for the modified File A. This results in the modified files being incrementally backed up. The forward snapshot file 226 includes a modification corresponding to the modified file. For example, the forward snapshot file 226 includes the modifications required to update the modified file A. One of skill in the art will recognize that the forward snapshot file 226 may include the modifications required to selectively update multiple modified files.

The blocking enhancer 222 may convert the forward snapshot file 226 to a block-based backup. For example, the blocking enhancer 222 converts the forward snapshot file 226 into a block backed backup format if the forward snapshot file 226 is not already in a block backed backup format. Since the blocking enhancer 222 reads only the modified blocks of modified files to be backed up using the file system "read" system call and stores the modified blocks using the file system "write" system call to update the block-based backup image, the backup image is always consistent from the file system's perspective.

Figure 3:
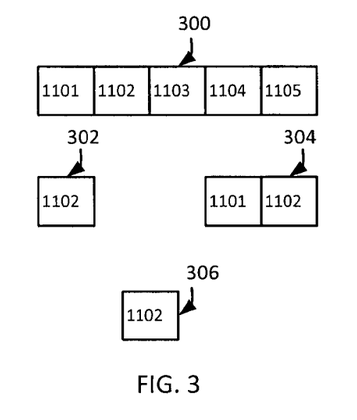
FIG. 3 is a screen shot illustrating extremely simplified example data for file-based snapshots for block-based backups, under an embodiment.

FIG. 3 illustrates extremely simplified example data for file-based snapshots for block-based backups, under an embodiment. The data includes blocks 300 in a file system, a modified block map 302, a modified file block map 304, and a modified file block 306. The blocks 300 indicate that the file system includes the blocks numbered 1101, 1102, 1103, 1104, and 1105. The modified block map 302 indicates that a modified block tracking driver identified that the block 1102 was modified after the most recent backup of the file system. The modified file block map 304 indicates that File A, which was modified after the most recent backup of the file system, includes the blocks 1101 and 1102. The modified file block 306 indicates the intersection of the modified block map 302 and the modified file block map 304 is the block 1102. Even though the File A includes both the block 1101 and the block 1102, the block 1101 is not in the intersection because the modified block map 302 indicates that the block 1101 was not modified after the most recent backup of the file system. Therefore, the blocking enhancer 222 does not have to read the block 1101 when creating an incremental backup of the file system because the forward snapshot function enabled for the mounted backup image 224 will use the previously created block 1101 to create the forward snapshot file 226. Although saving the time and resources by not reading the unmodified block 1101 in the file system may seem relatively insignificant in this extremely simplified example, when hundreds of files have been modified, and each of these files includes numerous unmodified blocks, the time and resources saved may be substantial.

Figure 4:
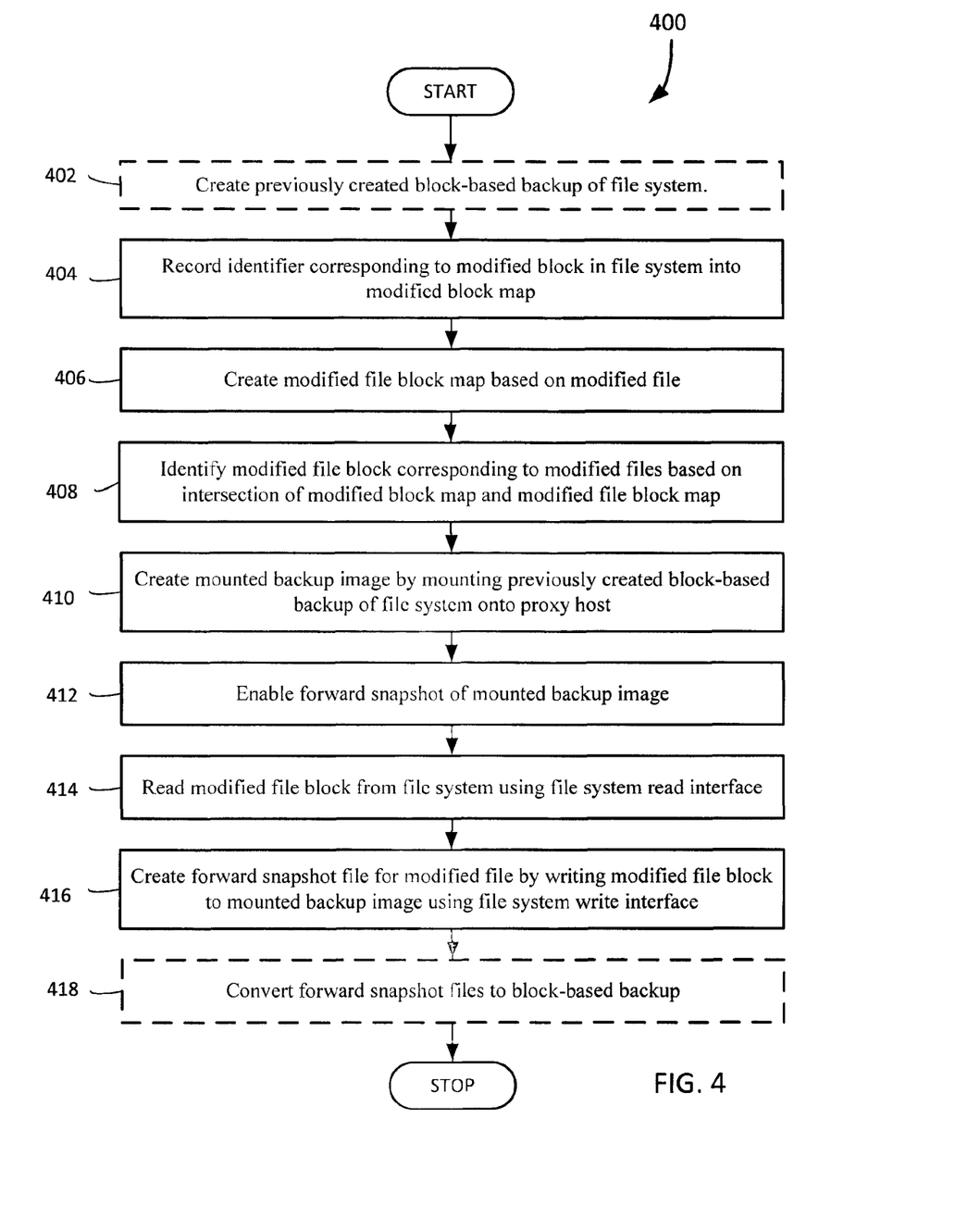
FIG. 4 is a flowchart that illustrates a method of file-based snapshots for block-based backups, under an embodiment.

FIG. 4 is a flowchart that illustrates a method for file-based snapshots for block-based backups, under an embodiment. Flowchart 400 illustrates method acts illustrated as flowchart blocks for certain steps involved in and/or between the clients 202-206 and/or the server 208 of FIG. 2.

A previously created block-based backup of a file system may be optionally created, block 402. For example, the backup application 218 creates a full backup of a file system by reading all of the blocks of the file system and storing copies of the blocks in a block based format.

An identifier corresponding to a modified block in a file system is recorded into a modified block map, block 404. For example, the blocking enhancer 222 records the block identifier 1102 that corresponds to a block modified since the last backup, and stores the block identifier 1102 into the modified block map 302.

A modified file block map is created based on a modified file, block 406. For example, the blocking enhancer 222 creates the modified file block map 304 based on the modified File A, which corresponds to the block identifiers 1101 and 1102.

A modified file block corresponding to a modified file is identified based on an intersection of a modified block map and a modified file block map, block 408. For example, the blocking enhancer 222 intersects the modified block map 302, which includes the block identifier 1102, and the modified file block map 304, which includes the block identifiers 1101 and 1102 corresponding to modified File A, to identify the block identifier 1102 corresponding to the modified File A.

A mounted backup image is created by mounting a previously created block-based backup of a file system onto a proxy host, block 410. For example, the blocking enhancer 222 mounts the previously created block-based backup of the file system onto the server 208.

A forward snapshot of a mounted backup image is enabled, block 412. For example, the blocking enhancer 222 enables a forward snapshot of the mounted backup image 224.

A modified file block is read from a file system using a file system read interface, block 414. For example, the blocking enhancer 222 uses a file system read( ) interface to read the modified block 1102 corresponding to the modified File A.

A forward snapshot file is created for a modified file by writing a modified file block to a mounted backup image using a file system write interface, block 416. For example, the blocking enhancer 222 uses a file system write( ) interface to write the modified block 1102 corresponding to the modified File A to the mounted backup image 224 at the same offset, and the forward snapshot function merges the unmodified block 1101 from the mounted backup image 224 with the modified block 1102, along with the metadata for the modified File A to create a complete forward snapshot file 226 for the modified File A.

A forward snapshot file is optionally converted to a block-based backup, block 418. For example, the blocking enhancer 222 converts the forward snapshot file 226 into a block backed backup format if the forward snapshot file 226 is not already in a block backed backup format. The blocking enhancer 222 enables selectively backing up of a subset of files in a file system.

Although FIG. 4 depicts the blocks 402-418 occurring in a specific order, the blocks 402-418 may occur in another order. In other implementations, each of the blocks 402-418 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for file-based snapshots for block-based backups, the system comprising:
   a processor-based application executed on a computer and configured to:
      record an identifier corresponding to a modified block in a file system into a modified block map;
      create a modified file block map based on a modified file;
      identify a modified file block corresponding to the modified file based on an intersection of the modified block map and the modified file block map;
      create a mounted backup image by mounting a previously created block-based backup of the file system onto a proxy host;
      enable a forward snapshot of the mounted backup image;
      read the modified file block from the file system using a file system read interface; and
      create a forward snapshot file for the modified file by writing the modified file block to the mounted backup image using a file system write interface.

2. The system of claim 1, wherein the processor-based application is further configured to create the previously created block-based backup of the file system.

3. The system of claim 1, wherein creating the modified file block map comprises using an application program interface associated with the file system to query the file system based on the modified file.

4. The system of claim 1, wherein the modified file block map comprises a mapping of a logical offset corresponding to the modified file to a corresponding physical location of a corresponding block that contains data corresponding to the logical offset.

5. The system of claim 1, wherein identifying the modified file block comprises identifying a logical offset and a length of consecutive modified blocks corresponding to the modified file.

6. The system of claim 1, wherein the forward snapshot file comprises a modification corresponding to the modified file.

7. The system of claim 1, wherein the processor-based application is further configured to convert the forward snapshot files to a block-based backup.

8. A computer-implemented method for file-based snapshots for block-based backups, the method comprising:
   recording an identifier corresponding to a modified block in a file system into a modified block map;
   creating a modified file block map based on a modified file;
   identifying a modified file block corresponding to the modified file based on an intersection of the modified block map and the modified file block map;
   creating a mounted backup image by mounting a previously created block-based backup of the file system onto a proxy host;
   enabling a forward snapshot of the mounted backup image;
   reading the modified file block from the file system using a file system read interface; and
   creating a forward snapshot file for the modified file by writing the modified file block to the mounted backup image using a file system write interface.

9. The method of claim 8, wherein the method further comprises creating the previously created block-based backup of the file system.

10. The method of claim 8, wherein creating the modified file block map comprises using an application program interface associated with the file system to query the file system based on the modified file.

11. The method of claim 8, wherein the modified file block map comprises a mapping of a logical offset corresponding to the modified file to a corresponding physical location of a corresponding block that contains data corresponding to the logical offset.

12. The method of claim 8, wherein identifying the modified file block comprises identifying a logical offset and a length of consecutive modified blocks corresponding to the modified file.

13. The method of claim 8, wherein the forward snapshot file comprises a modification corresponding to the modified file.

14. The method of claim 8, wherein the method further comprises converting the forward snapshot files to a block-based backup.

15. A computer program product, comprising a non-transitory computer-readable medium having a computer-readable program code embodied therein to be executed by one or more processors, the program code including instructions to:
record an identifier corresponding to a modified block in a file system into a modified block map;
create a modified file block map based on a modified file;
identify a modified file block corresponding to the modified file based on an intersection of the modified block map and the modified file block map;
create a mounted backup image by mounting a previously created block-based backup of the file system onto a proxy host;
enable a forward snapshot of the mounted backup image;
read the modified file block from the file system using a file system read interface; and
create a forward snapshot file for the modified file by writing the modified file block to the mounted backup image using a file system write interface.

16. The computer program product of claim 15, wherein the program code includes further instructions to create the previously created block-based backup of the file system.

17. The computer program product of claim 15, wherein creating the modified file block map comprises using an application program interface associated with the file system to query the file system based on the modified file.

18. The computer program product of claim 15, wherein the modified file block map comprises a mapping of a logical offset corresponding to the modified file to a corresponding physical location of a corresponding block that contains data corresponding to the logical offset.

19. The computer program product of claim 15, wherein identifying the modified file block comprises identifying a logical offset and a length of consecutive modified blocks corresponding to the modified file.

20. The computer program product of claim 15, wherein the forward snapshot files comprises a modification corresponding to the modified file.

* * * * *